US010002622B2

(12) United States Patent
Kim et al.

(10) Patent No.: US 10,002,622 B2
(45) Date of Patent: Jun. 19, 2018

(54) IRREGULAR PATTERN IDENTIFICATION USING LANDMARK BASED CONVOLUTION

(71) Applicant: Adobe Systems Incorporated, San Jose, CA (US)

(72) Inventors: Minje Kim, Savoy, IL (US); Paris Smaragdis, Urbana, IL (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 610 days.

(21) Appl. No.: 14/085,650

(22) Filed: Nov. 20, 2013

(65) Prior Publication Data
US 2015/0142433 A1  May 21, 2015

(51) Int. Cl.
*G10L 21/04* (2013.01)
*G10L 25/51* (2013.01)
*G10L 25/18* (2013.01)
*G10L 25/27* (2013.01)
*G06K 9/62* (2006.01)
*G06K 9/46* (2006.01)

(52) U.S. Cl.
CPC ............ *G10L 25/51* (2013.01); *G06K 9/6244* (2013.01); *G10L 25/18* (2013.01); *G10L 25/27* (2013.01); *G06K 2009/4695* (2013.01)

(58) Field of Classification Search
CPC ...................................................... G10L 21/04
USPC ................................................ 704/500–504
See application file for complete search history.

(56) References Cited

U.S. PATENT DOCUMENTS

| 8,374,365 | B2* | 2/2013 | Goodwin | G10L 19/173 381/17 |
| 8,379,868 | B2* | 2/2013 | Goodwin | G10L 19/008 381/17 |
| 2007/0269063 | A1* | 11/2007 | Goodwin | G10L 19/008 381/310 |
| 2008/0010038 | A1* | 1/2008 | Smaragdis | G06K 9/6226 702/181 |
| 2009/0254338 | A1* | 10/2009 | Chan | G10L 21/0272 704/205 |
| 2010/0030563 | A1* | 2/2010 | Uhle | G10L 19/008 704/500 |
| 2011/0194709 | A1* | 8/2011 | Ozerov | G10L 21/0272 381/119 |
| 2012/0116766 | A1* | 5/2012 | Wasserblat | G10L 15/08 704/254 |

(Continued)

OTHER PUBLICATIONS

Smaragdis, Paris et al., "Non-Negative Matrix Factorization for Irregularly-Spaced Transforms", in *Proceedings of the IEEE Workshop on Applications of Signal Processing to Audio and Acoustics (WASPAA)*, New Paltz, NY, Oct. 20-23, 2013., (Oct. 2013), 4 pages.

*Primary Examiner* — Michael N Opsasnick

(57) ABSTRACT

Pattern identification using convolution is described. In one or more implementations, a representation of a pattern is obtained that is described using data points that include frequency coordinates, time coordinates, and energy values. An identification is made as to whether sound data described using irregularly positioned data points includes the pattern, the identifying including use of a convolution of the frequency or time coordinates to determine correspondence with the representation of the pattern.

20 Claims, 8 Drawing Sheets

(56) References Cited

U.S. PATENT DOCUMENTS

2015/0142450 A1\* 5/2015 Liang ..................... G10H 1/125
  704/500

\* cited by examiner

400
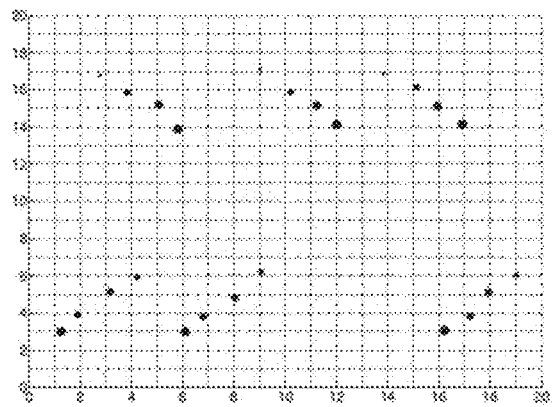
Input (a)
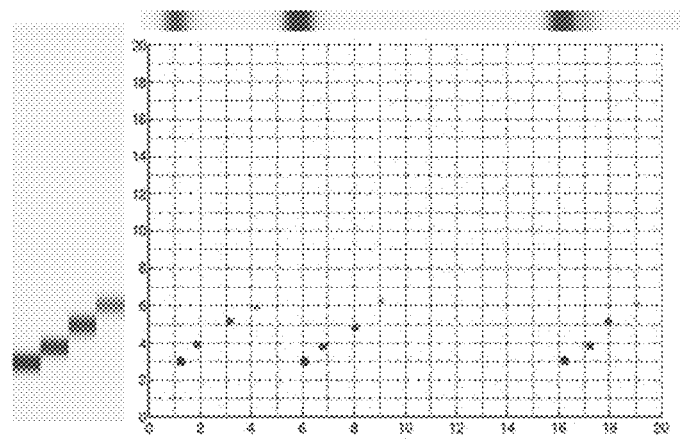
First Component Reconstruction (b)
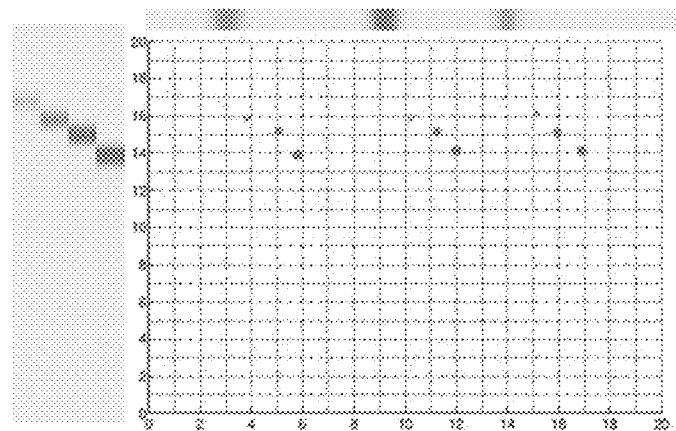
Second Component Reconstruction (c)
*Fig. 4*

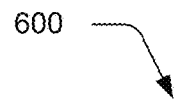

600

602
Obtain a representation of a pattern that is described using data points that include frequency coordinates, time coordinates, and energy values

604
Identify whether sound data described using irregularly positioned data points includes the pattern, the identifying including use of a convolution of the frequency or time coordinates to determine correspondence with the representation of the pattern

Fig. 6

IRREGULAR PATTERN IDENTIFICATION USING LANDMARK BASED CONVOLUTION

BACKGROUND

Identification of patterns in sound data, also known as pattern matching, may be utilized to support a wide variety of different usage scenarios. This may include audio source separation, which may involve identification of sound data that corresponds to different sound sources. For example, audio source separation may be performed to remove noise from a recording, separate different speakers in a dialog, and so on. In another example, pattern matching may be used to support word spotting and audio retrieval, such as a part of voice recognition (e.g., a virtual phone menu) by identifying particular keywords in the sound data, to locate sound data having desired keywords or other sounds, and so on.

Conventional techniques that were utilized to identify patterns in sound data, however, typically relied on a matrix representation of the sound data. This representation could be resource intensive to analyze, even when confronted with sparse sound data in which most of the frequency energies are close to zero. Consequently, such representations may be ill suited to real time scenarios and result in needless consumption of computational resources.

SUMMARY

Pattern identification using convolution is described. In one or more implementations, a representation of a pattern is obtained that is described using data points that include frequency coordinates, time coordinates, and energy values. An identification is made as to whether sound data described using irregularly positioned data points includes the pattern, the identifying including use of a convolution of the frequency or time coordinates to determine correspondence with the representation of the pattern.

In one or more implementations, sound data is represented using a plurality of vectors that reference a frequency coordinate, a time coordinate, and an energy value of each time/frequency point in the sound data. Irregularly positioned underlying patterns are identified in the represented sound data in different time or frequency positions in the sound data.

In one or more implementations, a system includes at least one module implemented at least partially in hardware and configured to generate a pattern using data points that include frequency coordinates, time coordinates, and energy values. The system also includes one or more modules implemented at least partially in hardware and configured to identify whether the pattern is included in sound data using convolutions to address irregular data points in a vectorized landmark space in the sound data as part of nonnegative matrix factorization (NMF).

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 depicts an example implementation showing repeating basis images as captured by the techniques described herein.

FIG. 6 is a flow diagram depicting a procedure in an example implementation in which a representation of a pattern is used to locate other patterns in sound data through use of convolution.

DETAILED DESCRIPTION

Overview

Pattern identification and other sound processing techniques may utilize matrices to represent sound data. However, in some instances sound spectrums are sparse (e.g., contain relatively low amounts of sound) and thus portions of the sound spectrum may contain frequency energies that are close to zero. Consequently, these portions that are sparse may not contribute to identification of patterns or other processing but are still processed nonetheless, thereby consuming computational resources.

Pattern identification techniques that leverage convolution are described. In one or more implementations, a compact representation of sound data is leveraged to identify patterns and minimize processing of sparse portions of sound data. For example, a representation may be formed that employs data points that describe frequency and time coordinates in a landmark space as well as energies (e.g., how loud) at those data points, e.g., as one or more vectors. Convolution may then be applied to discover underlying patterns that can appear at different time or frequency positions in the sound data, e.g., by adjustments in time and/or frequency to find patterns that correspond to each other. For example, pre-learned patterns may be used as fixed basis images to discover their activations in a landmark space as part of Nonnegative Factor Deconvolution (NFD), which is an extended version of Nonnegative Matrix Factorization that includes convolutions. Further discussion of these and other techniques may be found in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
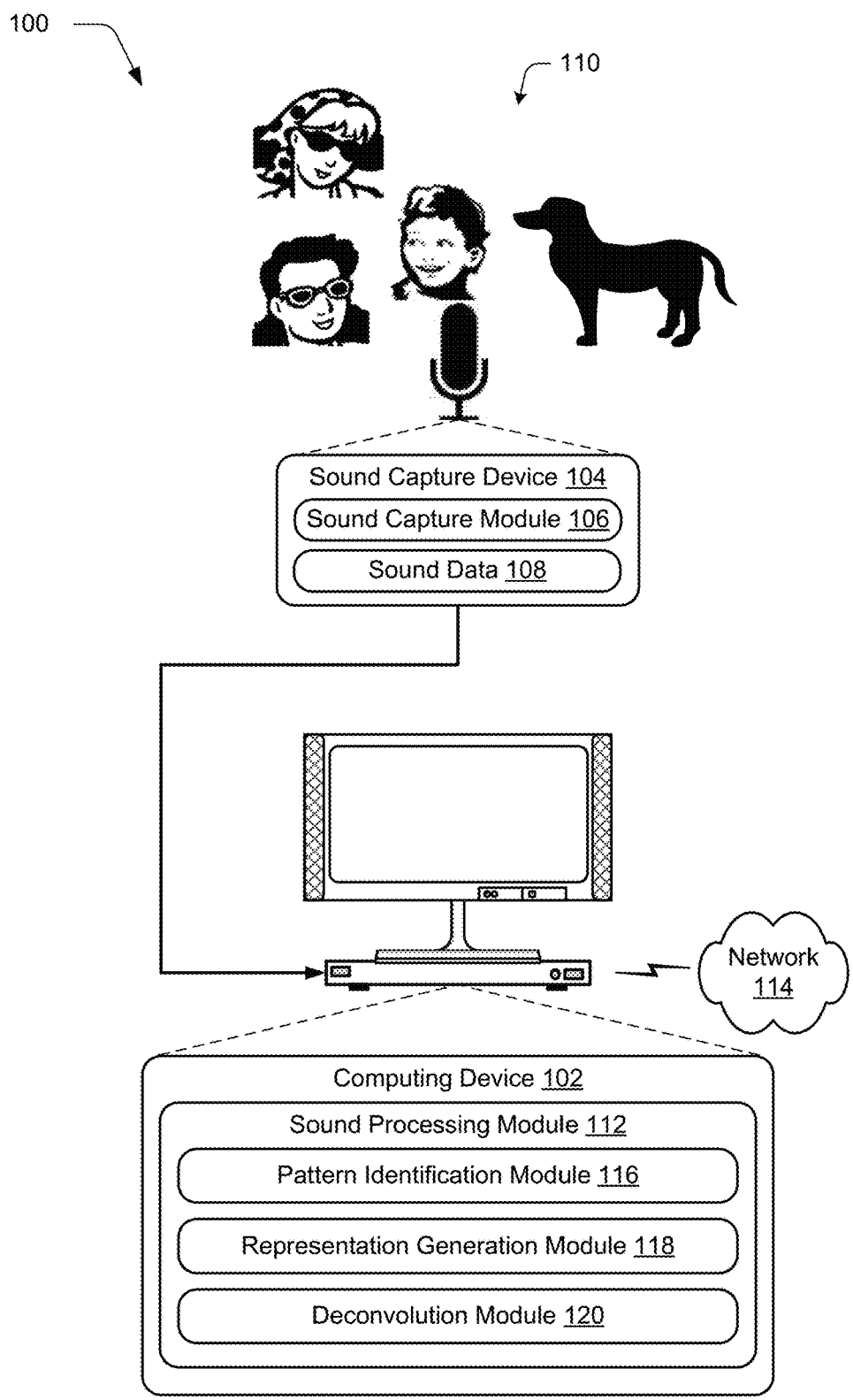
FIG. 1 is an illustration of an environment in an example implementation that is operable to employ techniques described herein.

FIG. 1 is an illustration of an environment 100 in an example implementation that is operable to employ pattern matching techniques described herein. The illustrated environment 100 includes a computing device 102 and sound capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The sound capture device 104 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 may be configured as part of the computing device 102, the sound capture device 104 may be representative of a plurality of sound capture devices, and so on.

The sound capture device 104 is illustrated as including respective sound capture module 106 that is representative of functionality to generate sound data 108. The sound capture device 104, for instance, may generate the sound data 108 as a recording of an audio scene 110 having one or more sources. This sound data 108 may then be obtained by the computing device 102 for processing.

The computing device 102 is illustrated as including a sound processing module 112. The sound processing module is representative of functionality to process the sound data 108. Although illustrated as part of the computing device 102, functionality represented by the sound processing module 112 may be further divided, such as to be performed "over the cloud" via a network 114 connection, further discussion of which may be found in relation to FIG. 8.

Examples of functionality of the sound processing module 112 are represented as a pattern identification module 116, a representation generation module 118, and a deconvolution module 120. The pattern identification module 116 is representative of functionality to identify patterns in sound data 108. This may include pre-learning of patterns as well as identification of those patterns in sound data. As previously described, pattern identification may be utilized to support a wide variety of functionality, such as source separation (e.g., audio denoising, music transcription, music remixing, audio-based forensics) and sound identification (e.g., for word spotting and audio retrieval).

The representation generation module 118 is representative of functionality to generate a representation of the sound data 108 for processing by the pattern identification module 116. The representation, for instance, may describe a landmark space of the sound data 108 using data points that describe time and frequency positions as well as an energy at those positions, e.g., as a vectorized representation. In this way, the representation may provide a compact representation of the landmark space that may be processed by the pattern identification module 116 with improved efficiency and consume less computational resources.

The deconvolution module 120 is representative of functionality to discover underlying patterns in the sound data 108 in conjunction with the pattern identification module 116 that may appear at different time and/or frequency positions in the sound data 108. Further discussion of convolution is described as follows and shown in a corresponding figure.

Figure 2:
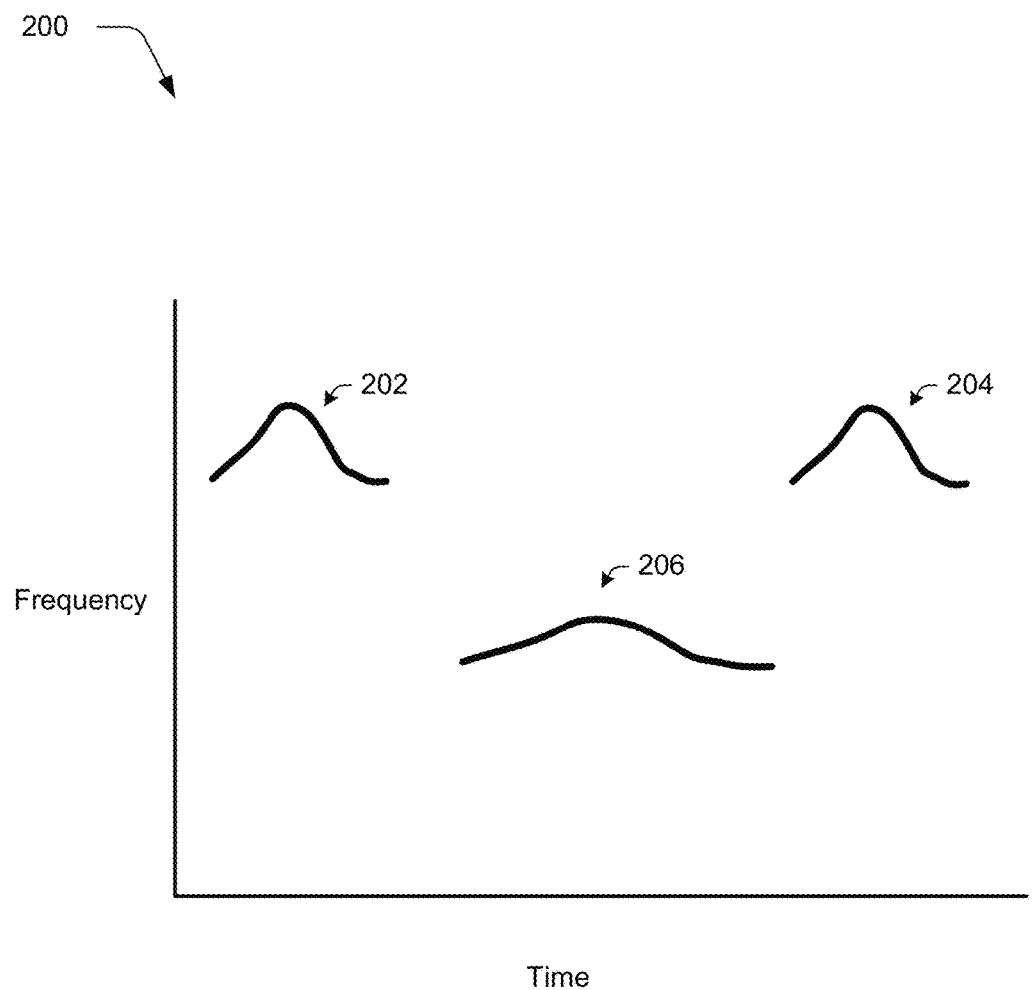
FIG. 2 depicts an example implementation of pattern identification that may be performed using representations and convolutions as applied to irregularly positioned data points.

FIG. 2 depicts an example implementation 200 of pattern identification that may be performed using representations and convolutions as applied to irregularly positioned data points. In this example, a pattern 202 is represented in sound data shown using frequency and time axes. Through use of the pattern matching module 116, another regularly positioned pattern 204 may also be discovered that approximately matches the pattern 202 in both the time and frequency dimensions. Additionally, through use of the representation generation module 118 and deconvolution module 120, an irregularly positioned pattern 206 may also be identified that appears at different time and frequency positions, which is this case the pattern consumes a longer period of time but a lesser number of frequencies.

Further, the representation may be represented using a relatively small amount of selected data points as representative of the entire comprehensive matrices to analyze audio data. In this way, a majority of the data points of a matrix form of sound signals may be ignored, because sound spectrums are often sparse with most of the frequency energies being close to zero in some instances. However, although the matrices can effectively represent the entirety of the sound data 108, it is challenging to apply existing pattern discovery methods on those irregular and sparse feature spaces since matrices with the regular grid are typically filled with zeros.

Accordingly, a Nonnegative Factor Deconvolution (NFD) technique is described in the following that may function using this sparse landmark data, which can be applied to any irregularly positioned data points. NFD may be utilized to discover underlying patterns that can appear different horizontal and vertical (time and frequency) positions as shown in FIG. 2. Additionally, pre-learned patterns may be used as fixed basis images to discover their activations in the landmark space which is described as follows.

Compact representations of data (e.g., sound data 108) may be used to improve speed and efficiency of a pattern matching process, such as in audio applications. For example, audio signals may be converted for a given short time frame of the signal to a frequency domain, e.g., a Short-Time Fourier Transform (STFT), with the magnitude of the resulting complex valued matrix may being computed. However, this may be problematic in some cases.

For example, for an irregular transform a typical STFT grid may not provide desired resolution for the time or frequency dimension. Although alternative irregular transforms may be used to tackle this issue, these transforms may result in non-matrix form data structures, which prevents the use of ordinary matrix-based techniques.

In another example, for sparse landmarks each of the elements except the local maxima may be discarded to obtain a compact representation. However, the resulting representation is a sparse matrix in which a majority of the elements are zeros. When this kind of matrices are represented with a pair of their positions and the value, a compact representation may be obtained but it is not qualified for matrix-based techniques.

In the following, Nonnegative Matrix Factorization (NMF) techniques (e.g., like decomposition) are configured to support irregular data types. NMF for irregularly-sampled data is first described which is then followed by a discussion of convolution in a single and plural axes, e.g., two dimensional.

NMF for Irregularly-Sampled Data

A regular factorization of a time/frequency matrix may be defined as:

$$X = W \cdot H \quad (1)$$

where "$X \in \mathbb{R}_+^{M \times N}$" is a matrix containing time/frequency energies, and "$W = [w_1, w_2, \ldots w_Z] \in \mathbb{R}_+^{M \times N}$" and "$H = [h_1^T, h_2^T, \ldots, h_Z^T]^T \in \mathbb{R}_+^{Z \times N}$" represent "Z" frequency and time factors, respectively. NMF is a factorization technique that estimates the two factors using the following iterative process:

$$P_z = \frac{w_z \cdot h_z}{W \cdot H}, \quad (2)$$

$$w_z = (X \odot P_z) \cdot 1^{N \times 1},$$

$$h_z^T = 1^{1 \times M} \cdot (X \odot P_z),$$

where "$1^{m \times n}$" is an "m×n" matrix of ones, and "$\odot$" and $$\text{``}\frac{[\ldots]}{[\ldots]}\text{''}$$

stand for element-wise multiplication and division, respectively. The value "$w_z$" is normalized by the sum of "$h_z$" at the end of each iteration in order to obtain a spectrum estimate that is unbiased by how much the estimate appears over time. This also sets the magnitude of "W" so that there are not multiple solutions that transfer energy between the two factors.

This formulation involves uniform sampling in the frequency and time axes, meaning that at each time point an energy reading is obtained for each the frequency values, and vice versa. However, for certain types of time/frequency transforms, such as constant-Q transforms, wavelets and reassigned spectrograms, this assumption does not hold and the resulting time/frequency energies cannot be represented using a finite-sized matrix. For such representations, a different format may be used such that for each energy value its exact frequency and time location is attached. In order to factorize such transforms, the factorization process may be redefined to accept this new format as follows.

Reformulation of NMF into a Vectorized Form

In this section, an assumption is made that the transforms that are used are regularly sampled as above. However, a different representation is used that permits extension of this formulation to non-regularly sampled transforms later. Instead of using a matrix "X" to represent the time/frequency energies, three vectors are used as follows:

$f \in \mathbb{Z}^{MN \times 1}$;

$t \in \mathbb{Z}^{MN \times 1}$; and $\text{vec}(X) = x \in \mathbb{R}_+^{MN \times 1}$, which hold the frequency coordinate, the time coordinate, and the energy value of each time/frequency data point, respectively. The elements of those vectors, "f(i), t(i), and x(i)," are indexed by "i={1, 2, ..., MN}."

Using the above-described formulation, the factorization process may be rewritten as follows:

$$x = \sum_{z=1}^{Z} v_z \odot g_z, \quad (3)$$

where now the pair of vectors "$v_z \in \mathbb{R}_+^{MN \times 1}$" and "$g_z \in \mathbb{R}_+^{MN \times 1}$" correspond to the values of the factors "W" and "H" as they are evaluated at the frequencies and times denoted by "f" and "t." With this, the iterative multiplicative update rules turn into the following form:

$$p_z = \frac{v_z \odot g_z}{\sum_{z'=1}^{Z} v_{z'} \odot g_{z'}} \quad (4)$$

$$v_z(i) = \sum_{\forall j : f(j) = f(i)} x(j) p_z(j)$$

$$g_z(i) = \sum_{\forall j : t(j) = t(i)} x(j) p_z(j)$$

Therefore, if the frequency/time indices lie on a regular integer grids, i.e., "f(i)∈(1, 2, . . . , N)," the same operations are being performed as in Equation (2) above. Additionally, Equation (4) may be rewritten to process each of the components simultaneously as follows:

$$P = \frac{V \odot G}{(V \odot G) \cdot 1^{K \times K}} \quad (5)$$

$$V = D_f \cdot (P \odot X)$$

$$G = D_t \cdot (P \odot X)$$

where the matrices, "P," "V," and "G," contain "Z" concatenated column vectors, each of which is for a latent variable "z," e.g., "P=[p1, p2; . . . ; pz]." Additionally, "$D_f, D_t \in \{0, 1\}^{MN \times MN}$" denote two matrices defined as:

$$D_f(i, j) = \begin{cases} 1, & f(i) = f(j) \\ 0, & f(i) \neq f(j) \end{cases} \quad (6)$$

$$D_t(i, j) = \begin{cases} 1, & t(i) = t(j) \\ 0, & t(i) \neq t(j) \end{cases}$$

Multiplying with these matrices results in summing over each of the elements that have the same frequency or time value respectively. The difference between the formulation in this section and in Equation (2) is that the two factors are obtained in a different format so that:

$$w_z(m) = v_z(i), \forall i : f(i) = m$$

$$h_z(n) = g_z(i), \forall i : t(i) = n$$

$$\text{vec}(w_z \cdot h_z) = v_z \odot g_z \quad (7)$$

where "m" and "n" are uniform indices defined in the ranges, "{1, 2, . . . , M}" and "{1, 2, . . . , N}," respectively.

Figure 3:
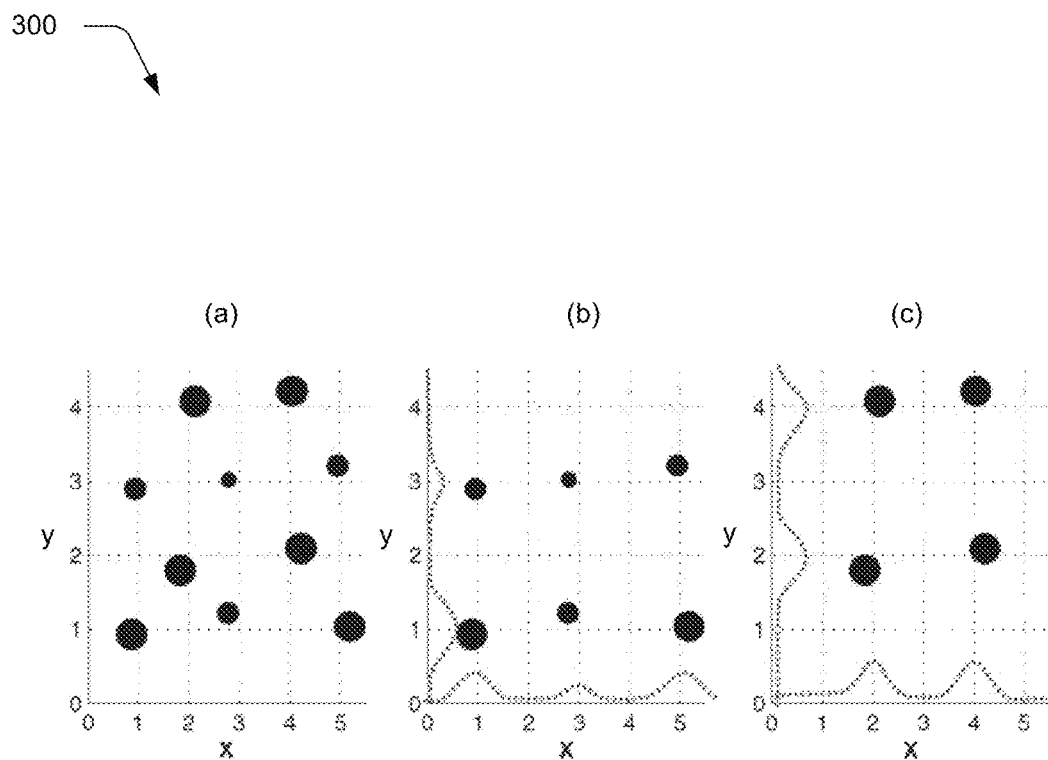
FIG. 3 depicts an example of a real-valued index data set.

FIG. 3 depicts an example 300 of a real-valued index data set. In "(a)," a set of data is shown that is not sampled on a grid, as evidences by the unaligned positioning of the data points. The size of the data points in this example indicates the magnitude of a corresponding assigned value "x(i)." In "(b)" and "(c)" two of the implied components that make up the data in "(a)" are shown having smoothed projections on both axes.

Non-negative Non-regular Matrix Factorization

In this example, the frequency and time vectors are real-valued and potentially comprised of unique elements. Accordingly, the summations in Equation (4) may become meaningless since as they sum over single points solely and thus do not capture the correlations that form as multiple frequencies are excited at roughly the same time.

To illustrate such a case, consider the simple example as shown in "(a)' in FIG. 3 where "f∈ℝ$^{MN \times 1}$" and "t∈ℝ$^{MN \times 1}$," i.e., real-valued frequency/time indices. In this case, the learning procedure is slightly amended to address this. For example, co-activation information was previously used to update the learned components. So, if for two points "x(i)" and "x(j)" and that "f(i)=f(j)=m" and subsequently "$D_f(i,j)=1$," a summation is performed when estimating "v." In the case above since each of the frequencies are real-valued and potentially unique, this summation does not happen and instead the learned factors "v" and "g" are uninformative. In order to alleviate, the two summing matrices are redefined such that "$D_f$, $D_t \in \mathbb{R}_+^{MN \times MN}$" and:

$$D_f(i, j) = e^{\frac{-|f(i)-f(j)|^2}{\sigma_f^2}}, \quad (8)$$

$$D_t(i, j) = e^{\frac{-|t(i)-t(j)|^2}{\sigma_t^2}}$$

This means that "$D_f(i,j)=1$, $\forall i,j: f(i)=f(j)$" and "$D_t(i,j)=1$, $\forall i,j: t(i)=t(j)$" are still maintained but in the case where two frequency or time labels are close but not exactly the same these values are still summed, albeit using a lower weight. For distant points the corresponding values in these matrices are close to zero, so no significant summation takes place.

Using this proposed approach, the results in "(b)" and "(c)" of FIG. 3 are obtained. The discovered factorization successfully decomposes the non-uniformly spaced input samples into two intuitively correct latent components. This kind of input cannot be represented using matrix forms as the data indices are not integer-valued.

Nonnegative Factor Deconvolution (NFD) for Irregularly-Sampled Data

An extended version of the non-regular NMF is described in this section. Instead of assuming the linear decomposition model underlying in NMF algorithms, a set of basis vectors are used as a basis image that can be convolved with filters. In this way, frequently adjacent basis vectors may be grouped to represent a certain temporal structure of the data, which is difficult to capture using conventional NMF. Accordingly, use of NFD on irregular data points may be utilized, which was not supported using conventional techniques.

In the following sections, a model is first introduced where the convolution happens along a single axis, e.g., time. A discussion follows in which a model is introduced where the convolution is performed along both time and frequency axes.

Nonnegative Factor Deconvolution Along a Single Dimension (1D-NFD)

When basis matrices are assumed, each of which holds a unique time-varying set of spectra, the NMF problem can be extended to a deconvolution model as follows:

$$X = \sum_{z=1}^{Z} \sum_{\tau=0}^{T-1} w_z^\tau \cdot \vec{h}_z^\tau, \quad (9)$$

where "$w_z^\tau$" is the "τ-th" one of the successive spectra of a basis matrix, and operation "$\vec{h}_z^\tau$" shifts the matrix "$h_z$" to the right by "τ" elements while filling the leftmost "τ" columns with zeros. Then, input "X" is reconstructed with a sum of filtered basis matrices. Here, a filter "$h_z$" is utilized per a latent component, which is convolved with the basis matrix. This new reconstruction model leads to a new set of update rules involving those temporal dynamics:

$$P_z^\tau = \frac{w_z^\tau \cdot \vec{h}_z^\tau}{\sum_{z=1}^{Z} \sum_{\tau=0}^{T-1} w_z^\tau \cdot \vec{h}_z^\tau}, \quad (10)$$

$$w_z^\tau = (X \odot P_z^\tau) \cdot 1^{N \times 1}, \quad (11)$$

$$h_z^\tau = 1^{1 \times M} \cdot (X \odot P_z^\tau), \quad (12)$$

$$h_z = \frac{1}{T} \sum_{\tau=0}^{T-1} \overleftarrow{h_z^\tau}. \quad (13)$$

Reformulation of 1D-NFD into a Vectorized Form

As for the same types of vectorized inputs "f(i)," "t(i)," and "x(i)" as before, the deconvolution is defined as:

$$x = \sum_{z=1}^{Z} \sum_{\tau=0}^{T-1} v_z^\tau \odot g_z^\tau, \quad (14)$$

where "$v_z^\tau \in \mathbb{R}_+^{MN \times 1}$" and "$g_z^\tau \in \mathbb{R}_+^{MN \times 1}$." The multiplicative update rules are now:

$$p_z^\tau = \frac{v_z^\tau \odot g_z^\tau}{\sum_{z'=1}^{Z} \sum_{\tau'=0}^{T-1} v_{z'}^{\tau'} \odot g_{z'}^{\tau'}} \quad (15)$$

$$v_z^\tau(i) = \sum_{\forall j: f(j)=f(i)} x(j) p_z^\tau(j) \quad (16)$$

$$g_z^\tau(i) = \sum_{\forall j: t(j)=t(i)} x(j) p_z^\tau(j) \quad (17)$$

$$g_z(i) = \frac{1}{T} \sum_{\tau=0}^{T-1} \sum_{\forall j: t(j)=t(i)+\tau} g_z^\tau(j) \quad (18)$$

$$g_z^\tau(i) = \sum_{\forall j: t(j)=t(i)-\tau} g_z(j). \quad (19)$$

Note the shift notation is not used here as the input is not a grid anymore. But, "$g_z^\tau$" in Equation (15) is a shifted version of "$g_z$" from the previous iteration using Equation (19).

This may be rewritten with matrix notation as follow:

$$P^\tau = \frac{V^\tau \odot G^\tau}{\sum_{\tau=0} V^\tau \odot G^\tau}, \quad (20)$$

$$V^\tau = D_f \cdot (P^\tau \odot X),$$

$$G^\tau = D_t \cdot (P^\tau \odot X),$$

$$G = \frac{1}{T} \sum_{\tau=0} (D_\tau)^{-1} \cdot G^\tau,$$

$$G^\tau = D_\tau \cdot G,$$

where "$X = x \cdot 1^{1 \times Z}$." The kernel matrices "$D_f$, $D_t$" are the same with the previous ones in Equation (6), but "$D_\tau$," and "$(D_\tau)^{-1}$" are configured as considering that time lacks "$\tau$" and both operations involve shifts to the left and right as well:

$$D_\tau(i, j) = \begin{cases} 1, & t(i) = t(j) + \tau \\ 0, & t(i) \neq t(j) + \tau \end{cases}, \quad (21)$$

$$(D_\tau)^{-1}(i, j) = \begin{cases} 1, & t(i) + \tau = t(j) \\ 0, & t(i) + \tau \neq t(j) \end{cases}.$$

Non-negative Non-regular Factor Deconvolution (Non-regular 1D-NFD)

The non-regular version of 1D-NFD discussed here uses the proposed vectorized update rules in Equation (20) except that kernel matrices in Equation (21) are replaced with corresponding Gaussians, such as in Equation (22):

$$D_\tau(i, j) = e^{\frac{-|t(i)-t(j)-\tau|^2}{\sigma_t^2}}, \quad (22)$$

$$(D_\tau)^{-1}(i, j) = e^{\frac{-|t(i)+\tau-t(j)|^2}{\sigma_t^2}}.$$

NFD Along Both Dimensions (2D-NFD)

FIG. 4 depicts an example implementation 400 showing repeating basis images as captured by the techniques described herein. In this example, repeating two-dimensional patterns are shown that are irregularly located on the two-dimensional surface. Accordingly, the 1D-NFD technique described above is expanded to a 2D version so that the kernel basis matrix are free to appear anywhere.

The reconstruction model may be expressed as:

$$X = \sum_{z=1}^{Z} \sum_{\tau=0}^{T-1} \sum_{\phi=0}^{F-1} K_z^{\phi,\tau} A_z^{\uparrow \phi, \to \tau}, \quad (23)$$

where "$K_z^{\phi,\tau} \in \mathbb{R}_+^{F \times T}$" is the discretized kernel at the position "$(\phi, \tau)$," and operation "$A_z^{\uparrow \phi, \to \tau}$" shifts the matrix "$A_z$" to the right by "$\tau$" elements and to up by "$\phi$" while filling the leftmost "$\tau$" columns and bottom "$\phi$" rows with zeros. Then, the input "X" is then reconstructed with a sum of filtered basis matrices. Here a two dimensional filter "$A_z$" is used per latent component, which is convolved with the basis matrix. This reconstruction model leads to a set of update rules involving those temporal and frequency dynamics:

$$P_z^{\phi,\tau} = \frac{K_z^{\phi,\tau} A_z^{\uparrow \phi, \to \tau}}{\sum_{z=1}^{Z} \sum_{\tau=0}^{T-1} \sum_{\phi=0}^{F-1} K_z^{\phi,\tau} A_z^{\uparrow \phi, \to \tau}}, \quad (24)$$

$$K_z^{\phi,\tau} = (X \odot P_z^{\phi,\tau}) \cdot 1^{N \times M}, \quad (25)$$

$$A_z^{\phi,\tau} = X \odot P_z^{\phi,\tau}, \quad (26)$$

$$A_z = \frac{1}{TF} \sum_{\tau=0}^{T-1} \sum_{\phi=0}^{F-1} A_z^{\phi,\tau \downarrow \phi, \leftarrow \tau}. \quad (27)$$

Note that now the posterior probabilities "P" are represented via a five dimensional tensor with axis for "z," "t," "f," "φ" and "τ."

Reformulation of 2D-NFD into a Vectorized Form

As for the same types of vectorized inputs "f(i)," "t(i)," and "x(i)" as before, the deconvolution is defined as:

$$x = \sum_{z=1}^{Z} \sum_{\tau=0}^{T-1} \sum_{\phi=0}^{F-1} K_z^{\phi,\tau} g_z^{\phi,\tau}, \quad (28)$$

where "$g_z^{\phi,\tau} \in \mathbb{R}_+^{MN \times 1}$." The multiplicative update rules are now:

$$p_z^{\phi,\tau} = \frac{K_z^{\phi,\tau} g_z^{\phi,\tau}}{\sum_{z=1}^{Z} \sum_{\tau=0}^{T-1} \sum_{\phi=0}^{F-1} K_z^{\phi,\tau} g_z^{\phi,\tau}}, \quad (29)$$

$$K_z^{\phi,\tau} = \sum_{\forall i} \sum_{\phi=0}^{F-1} \sum_{\tau=0}^{T-1} x(i) p_z^{\phi,\tau}(i), \quad (30)$$

$$g_z^{\phi,\tau}(i) = x(i) p_z^{\phi,\tau}(i), \quad (31)$$

$$g_z(i) = \frac{1}{FT} \sum_{\tau=0}^{T-1} \sum_{\phi=0}^{F-1} \sum_{\substack{\forall j: t(j) = t(i) + \tau \\ f(j) = f(i) + \phi}} g_z^{\phi,\tau}(j), \quad (32)$$

$$g_z^{\phi,\tau}(i) = \sum_{\substack{\forall j: t(j) = t(i) - \tau \\ f(j) = f(i) - \phi}} g_z(j). \quad (33)$$

Note that as before the shift notation is not used here as the input is not a grid anymore. But, "$g_z^{\phi,\tau}$" in Equation (29) is introduced to represent the shifted version of "$g_z$" along both directions from the previous iteration using Equation (33).

Equations (32) and (33) may now be rewritten with matrix notation as follows:

$$g_z = \frac{1}{FT} \sum_{\tau=0}^{T-1} \sum_{\phi=0}^{F-1} (D_{\phi,\tau})^{-1} \cdot g_z^{\phi,\tau}, \quad (34)$$

$$g_z^{\phi,\tau} = D_{\phi,\tau} \cdot g_z.$$

The kernel matrices "$D_{\phi\tau}$" and "$D_{\phi\tau}^{-1}$" may also consider time lacks "$\tau$" and frequency shifts "$\phi$," and so are defined by:

$$D_{\phi,\tau}(i,j) \begin{cases} 1, & t(i) = t(j) + \tau \text{ and } f(i) = f(j) + \phi \\ 0, & \text{otherwise} \end{cases} \quad (35)$$

$$D_{\phi,\tau}(i,j)^{-1} \begin{cases} 1, & t(i) + \tau = t(j) \text{ and } f(i) + \phi = f(j) \\ 0, & \text{otherwise} \end{cases}.$$

Non-Negative Non-regular Factor Deconvolution (Non-regular 2D-NFD)

Another non-regular version of 2D-NFD is now described that uses the proposed vectorized update rules from Equations (29) to (31), and (34) except that the kernel matrices in Equation (35) are replaced with corresponding Gaussians, such as in Equation (22):

$$D_{\phi,\tau}(i,j) = e^{\frac{-|t(i)-t(j)-\tau|^2}{\sigma_t^2} + \frac{-|f(i)-f(j)-\phi|^2}{\sigma_\phi^2}}, \quad (36)$$

$$(D_{\phi,\tau})^{-1}(i,j) = e^{\frac{-|t(i)+\gamma-t(j)|^2}{\sigma_t^2} + \frac{-|f(i)+\phi-f(j)-\phi|^2}{\sigma_\phi^2}}.$$

Figure 5:
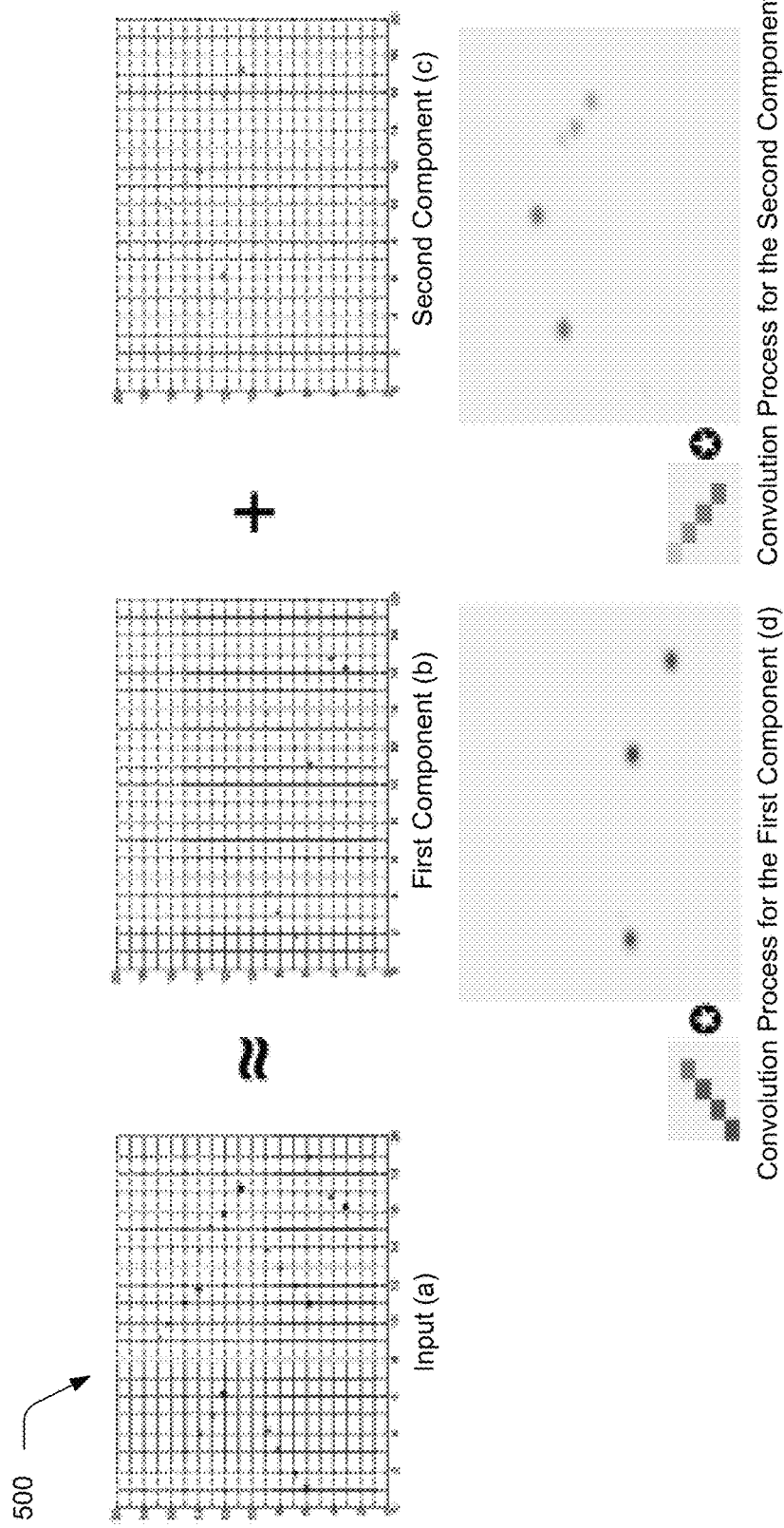
FIG. 5 shows an example of deconvolution results on example sound data where two distinct basis images are repeating along the horizontal and vertical directions.

FIG. 5 shows an example 500 of deconvolution results on example sound data where two distinct basis images are repeating along the horizontal and vertical directions. Note that the resulting basis images contain temporal structures and now may capture activations in different frequency regions. Thus, the results show two sets of repeating two dimensional patterns that are irregularly located on a two dimensional surface. In this way, convolutions on time and/or frequency may be used to identify patterns that would not otherwise be identifiable using conventional techniques, further discussion of which may be found in relation to the following procedures.

Example Procedures

The following discussion describes pattern matching techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

FIG. 6 depicts a procedure 600 in an example implementation in which a representation of a pattern is used to locate other patterns in sound data through use of convolution. A representation of a pattern is obtained that is described using data points that include frequency coordinates, time coordinates, and energy values (block 602). The representation, for instance, may be formed as one or more vectors.

An identification is made as to whether sound data described using irregularly positioned data points includes the pattern, the identification including use of a convolution of the frequency or time coordinates to determine correspondence with the representation of the pattern (block 604). The identification, for instance, may involve changing an amount of time over which the pattern is performed and/or a number of frequencies involving in the pattern, e.g., by shrinking or stretching corresponding ranges. In this way, irregular patterns may be identified in the sound data as described above.

Figure 7:
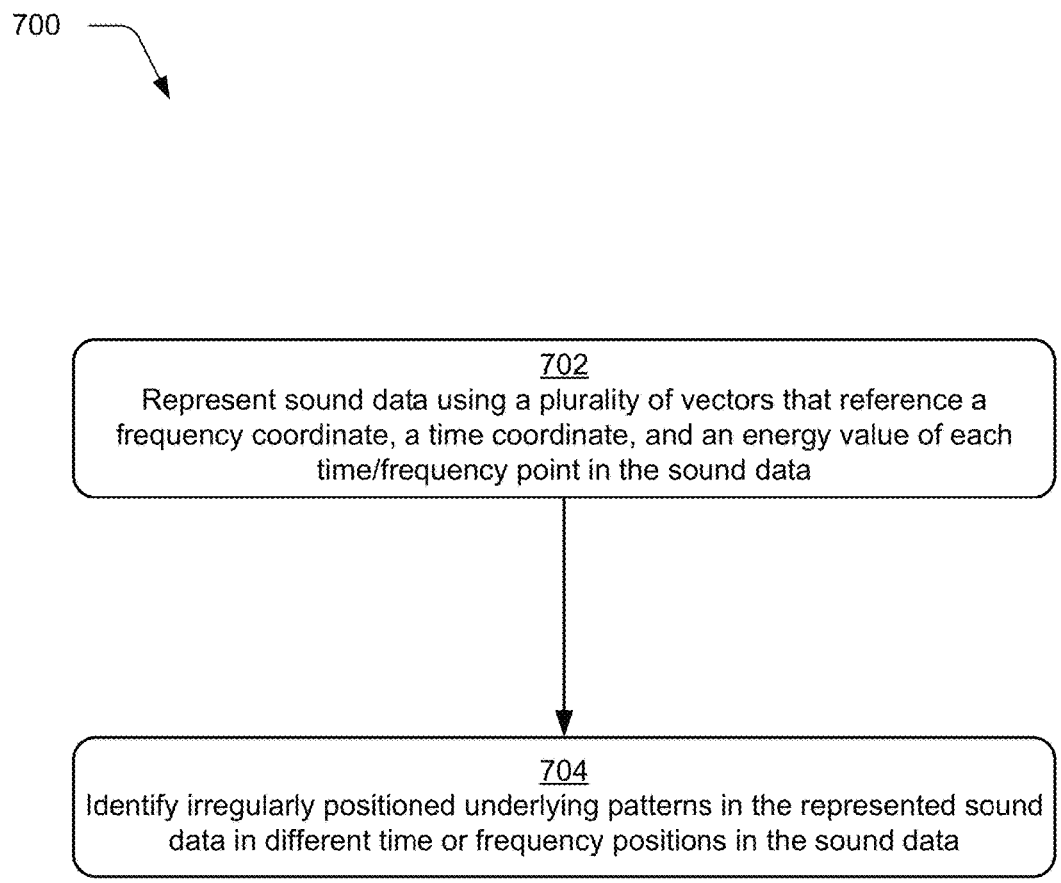
FIG. 7 is a flow diagram depicting a procedure in an example implementation in which irregularly positioned underlying patterns in sound data are identified.

FIG. 7 depicts a procedure 700 in an example implementation in which irregularly positioned underlying patterns in sound data are identified. Sound data is represented using a plurality of vectors that reference a frequency coordinate, a time coordinate, and an energy value of each time/frequency point in the sound data (block 702). In this way, the sound data 108 may be represented as a landmark space without use of needless values as performed in conventional matrix techniques, e.g., such as to represent data points having little to no energy that are conventionally represented as zeros.

Irregularly positioned underlying patterns are identified in the represented sound data in different time or frequency positions in the sound data (block 704). Continuing with the previous example, these vectors may then be used to identify irregular patterns that have differences along time and/or frequency axes, e.g., such as to consume different amounts of either one and thus may be distinguished from regular patters. A variety of other examples are also contemplated without departing from the spirit and scope thereof.

Example System and Device

Figure 8:
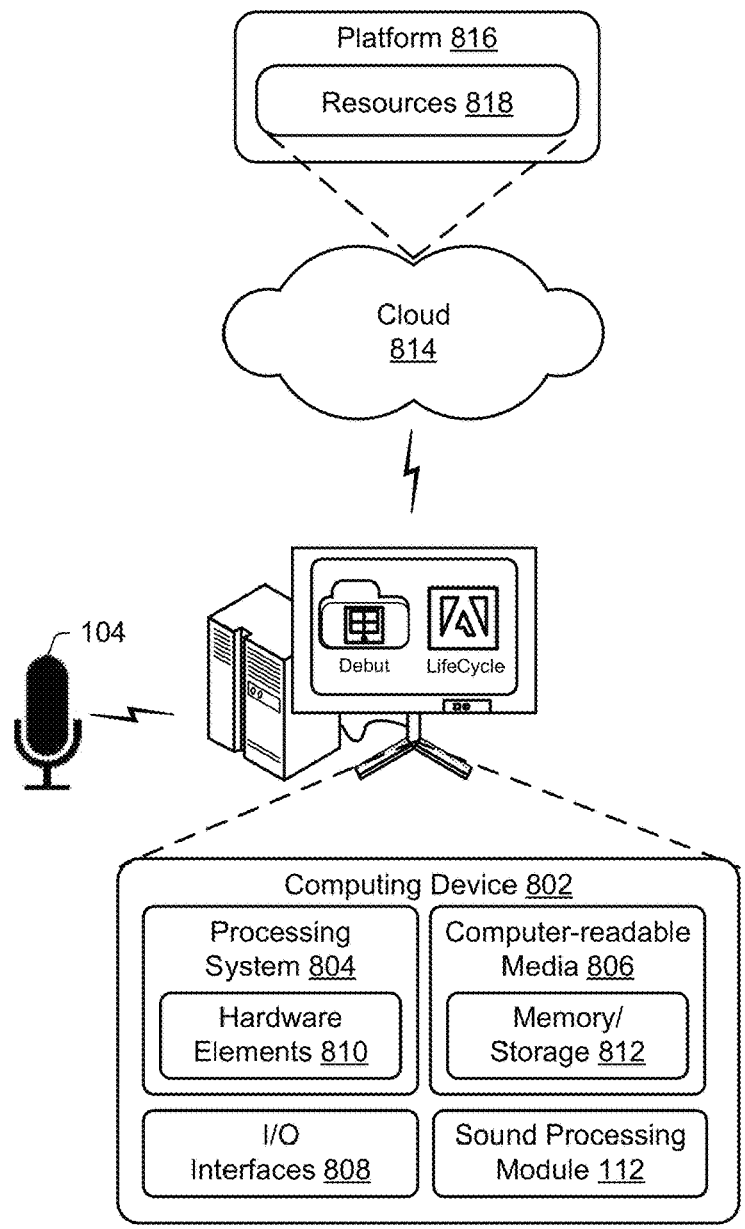
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the sound processing module 112, which may be configured to process image data, such as image data captured by an image capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM). Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In an environment supporting improved identification of irregular patterns of sound in sound data, a method implemented by a computing device, the method comprising:
   converting, by the computing device, a matrix representation of the sound data into a plurality of sound data vectors as part of a vectorized landmark space, each sound data vector of the plurality of sound data vectors having data points that include a frequency coordinate, a time coordinate, and an energy value;
   generating, by the computing device, a temporal structure for the sound data by grouping subsets of the plurality of sound data vectors;
   obtaining, by the computing device and based on the temporal structure, a representation of a pattern of sound as at least one pattern vector that is described using data points that include a frequency coordinate, a time coordinate, and an energy value;
   convolving, by the computing device, the frequency coordinate or the time coordinate of a sound data vector of the plurality of sound data vectors or the frequency coordinate or the time coordinate of the at least one pattern vector;
   identifying, by the computing device, whether the sound data includes irregularly positioned data points that correspond to the pattern of sound using the convolved sound data vector or the at least one convolved pattern vector; and
   displaying, by the computing device, a result of the identifying in a user interface, the displayable result illustrating the irregularly positioned data points that correspond to the pattern of sound.

2. A method as described in claim 1, wherein the identifying includes the convolution of both frequency and time coordinates.

3. A method as described in claim 1, wherein the identifying is performed at least in part using nonnegative factor deconvolution.

4. A method as described in claim 3, wherein nonnegative factor deconvolution is an extended version of nonnegative matrix factorization (NMF) that involves use of convolutions.

5. A method as described in claim 1, further comprising approximating the irregularly positioned data points using Gaussian kernels.

6. A method as described in claim 5, wherein the approximating is performed responsive to a determination that the data points of the sound data do not align in a time/frequency space.

7. A method as described in claim 1, wherein the identifying includes using the representation of the pattern as a fixed basis image to discover activations in a landmark space of the sound data.

8. In an environment supporting improved identification of irregular patterns of sound in sound data, a method implemented by a computing device, the method comprising:
   generating, by at least one computing device, a representation of the sound data using a plurality of vectors that reference a frequency coordinate, a time coordinate, and an energy value of each time/frequency point in the sound data, the representation of the sound data including a temporal structure based on groupings of subsets of the plurality of vectors;
   applying, by the at least one computing device, a set of rules to the representation of the sound data to identify irregularly positioned underlying patterns of sound as vectors in the represented sound data in different time or frequency positions in the sound data using the temporal structure; and
   displaying, by the computing device, a result of the applying, the displayable result showing the irregularly positioned underlying patterns of sound.

9. A method as described in claim 8, wherein the set of rules are applied to identify correspondence with one or more pre-defined patterns and thereby identify whether the sound data includes the one or more pre-defined patterns.

10. A method as described in claim 8, wherein the applying the set of rules includes applying a convolution of either frequency or time.

11. A method as described in claim 8, wherein applying the set of rules includes applying a convolution of both frequency and time.

12. A method as described in claim 8, wherein the applying is performed at least in part using nonnegative factor deconvolution that is an extended version of nonnegative matrix factorization (NMF) that involves use of convolutions.

13. A method as described in claim 8, further comprising approximating data points of the irregularly positioned underlying patterns using Gaussian kernels.

14. A method as described in claim 8, wherein the representing includes converting a matrix representation of the sound data into a vectorized landmark space.

15. A computing device comprising:
   a processing system; and
   a non-transitory computer-readable storage media having instructions stored thereon that, responsive to execution by the processing system, causes the processing system to perform operations comprising:
      generating a representation of the sound data using a plurality of vectors that reference a frequency coordinate, a time coordinate, and an energy value of each time/frequency point in the sound data, the representation of the sound data including a temporal structure based on groupings of subsets of the plurality of vectors;
      applying a set of rules to the representation of the sound data to identify irregularly positioned underlying patterns of sound as vectors in the represented sound data in different time or frequency positions in the sound data using the temporal structure; and
      outputting a displayable result of the applying as indicating the irregularly positioned underlying patterns of sound.

16. A computing device as described in claim 15, wherein the set of rules are applied to identify correspondence with one or more pre-defined patterns and thereby identify whether the sound data includes the one or more pre-defined patterns.

17. A computing device as described in claim 15, wherein the applying the set of rules includes applying a convolution of either frequency or time.

18. A computing device as described in claim 15, wherein applying the set of rules includes applying a convolution of both frequency and time.

19. A computing device as described in claim 15, wherein the applying is performed at least in part using nonnegative factor deconvolution that is an extended version of nonnegative matrix factorization (NMF) that involves use of convolutions.

20. A computing device as described in claim 15, wherein the instructions further comprise approximating data points of the irregularly positioned underlying patterns using Gaussian kernels.

* * * * *